US008428354B2

(12) United States Patent
Prasad et al.

(10) Patent No.: US 8,428,354 B2
(45) Date of Patent: Apr. 23, 2013

(54) IMAGE SEGMENTATION BY HIERARCHIAL AGGLOMERATION OF POLYGONS USING ECOLOGICAL STATISTICS

(75) Inventors: Lakshman Prasad, Los Alamos, NM (US); Sriram Swaminarayan, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 380 days.

(21) Appl. No.: 12/822,059

(22) Filed: Jun. 23, 2010

(65) Prior Publication Data
US 2010/0322518 A1 Dec. 23, 2010

Related U.S. Application Data

(60) Provisional application No. 61/219,588, filed on Jun. 23, 2009.

(51) Int. Cl.
*G06K 9/34* (2006.01)
(52) U.S. Cl.
USPC ............................................................ 382/173
(58) Field of Classification Search .................. 382/173, 382/162–165, 190, 199, 204, 224–228, 282–284
See application file for complete search history.

(56) References Cited

U.S. PATENT DOCUMENTS

| 7,127,104 | B2 | 10/2006 | Prasad | |
|---|---|---|---|---|
| 7,925,084 | B1 * | 4/2011 | Skirko | 382/162 |
| 8,224,089 | B2 * | 7/2012 | Nielsen | 382/173 |

OTHER PUBLICATIONS

Prasad and Skourikhine, Vectorized image segmentation via trixel agglomeration, Pattern Recognition 39(4): 501-514, Apr. 2006.

* cited by examiner

*Primary Examiner* — Ishrat I Sherali
(74) *Attorney, Agent, or Firm* — Meredith H. Schoenfeld

(57) ABSTRACT

A method for rapid hierarchical image segmentation based on perceptually driven contour completion and scene statistics is disclosed. The method begins with an initial fine-scale segmentation of an image, such as obtained by perceptual completion of partial contours into polygonal regions using region-contour correspondences established by Delaunay triangulation of edge pixels as implemented in VISTA. The resulting polygons are analyzed with respect to their size and color/intensity distributions and the structural properties of their boundaries. Statistical estimates of granularity of size, similarity of color, texture, and saliency of intervening boundaries are computed and formulated into logical (Boolean) predicates. The combined satisfiability of these Boolean predicates by a pair of adjacent polygons at a given segmentation level qualifies them for merging into a larger polygon representing a coarser, larger-scale feature of the pixel image and collectively obtains the next level of polygonal segments in a hierarchy of fine-to-coarse segmentations. The iterative application of this process precipitates textured regions as polygons with highly convolved boundaries and helps distinguish them from objects which typically have more regular boundaries. The method yields a multiscale decomposition of an image into constituent features that enjoy a hierarchical relationship with features at finer and coarser scales. This provides a traversable graph structure from which feature content and context in terms of other features can be derived, aiding in automated image understanding tasks. The method disclosed is highly efficient and can be used to decompose and analyze large images.

10 Claims, 5 Drawing Sheets

Fig. 1a: Raster image
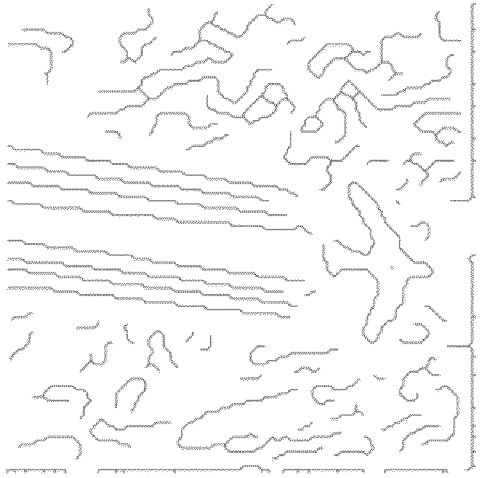
Fig. 1b: Canny edges
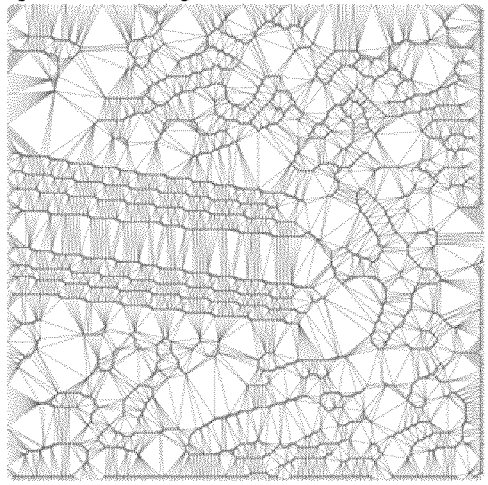
Fig. 1c: Delaunay triangulation
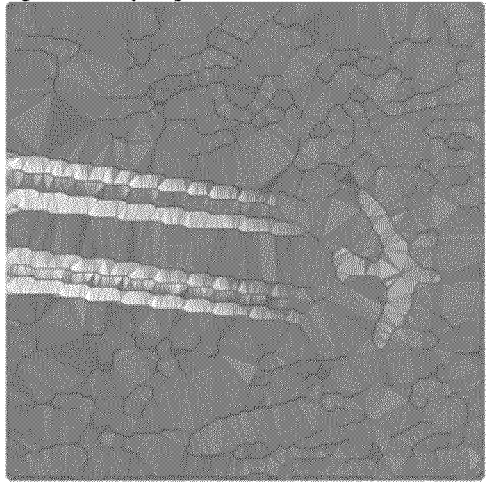
Fig. 1d: Sampling triangle color
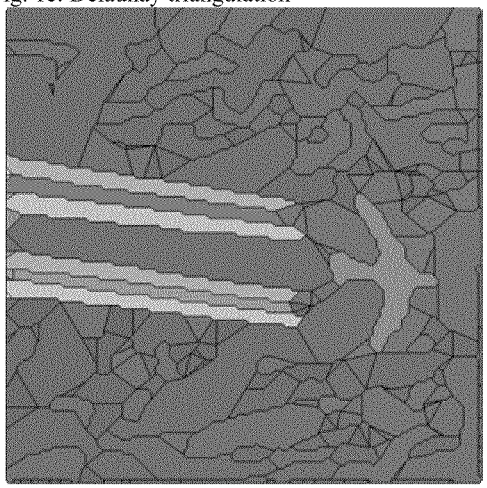
Fig. 1e: Polygons from grouping trixels
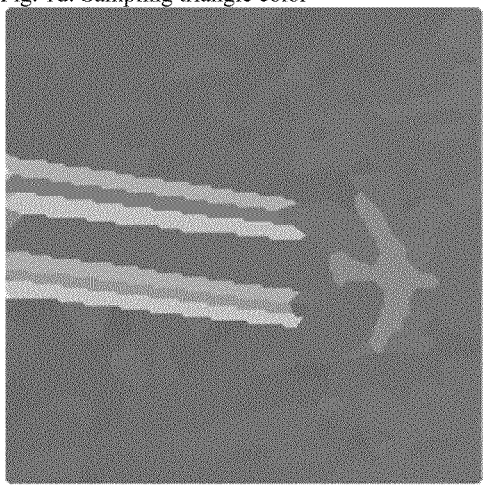
Fig. 1f: Final vector image
Figure 1: Steps in VISTA

Figure 2. Example hierarchical segmentations on a high contrast low texture image (o.447 seconds) and a low contrast high texture image (0.493 seconds).

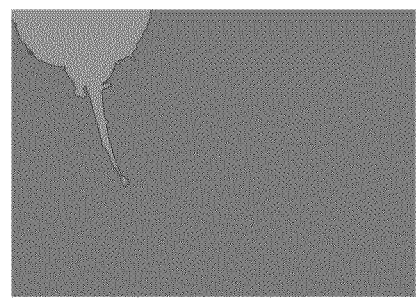
Fig. 3a Skate
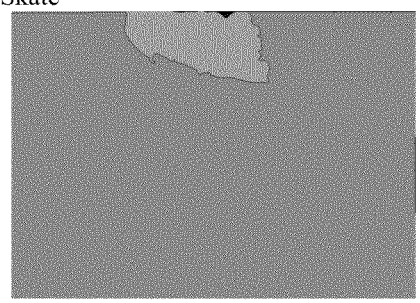
Fig. 3b Flounder
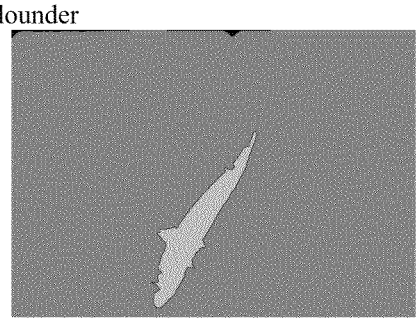
Fig. 3c Hake
Figure 3. Example segmentations of camouflaged fish using wiggle filtering.

IMAGE SEGMENTATION BY HIERARCHIAL AGGLOMERATION OF POLYGONS USING ECOLOGICAL STATISTICS

This application claims the benefit of U.S. Provisional Application No. 61/219,588, filed Jun. 23, 2009, the content of which is herein incorporated by reference in its entirety.

STATEMENT REGARDING FEDERAL RIGHTS

This invention was made with government support under Contract No. DE-AC52-06NA25396, awarded by the U.S. Department of Energy. The government has certain rights in the invention.

BACKGROUND OF INVENTION

Image segmentation is the first and perhaps the most critical image processing step to automating image understanding by computers. Segmentation consists of decomposing an image into its constituent salient features and objects that define the semantic content of the image. Image segmentation sets the stage for object detection and recognition by providing a high-level representation of an image in terms of regions of uniform color/intensity and geometric regularity.

Objects in images are typically contiguous subsets of such regions. Thus, image segmentation transforms an image from a low-level pixel-based representation to an intermediate-level region-based representation that enables the piecing together of the 'jigsaw puzzle' of regions into individual objects of the image. Image segmentation can be thought of as representing the method of perception in human vision. This representation does not assume a priori knowledge of the objects in an image; rather it uses local regularities and structure in an image to parse the image into distinct parts.

There has been no universally applicable method to date that can segment all images equally well. Although there are several segmentation methods developed over the decades, almost all can be classified, broadly speaking, into one of two categories: 1) methods that seek structure by decomposing an image into regions of uniform color or intensity, generally assuming that, to a large extent, parts of an object are dominated by one color; 2) methods that seek structure by identifying parts of an image that exhibit rapid change in color/intensity, generally assuming that boundaries of objects are sites of such rapid change in intensity.

Digital images are made up of pixels of subtly varying intensities that are dithered in such a way as to produce the effects of shade and gradation of color. Since methods of the first kind rely on binning pixels into fewer classes, this in general results in speckle noise due to neighboring pixel differences being enhanced. It also has the effect of marring edges that have more gradual variation in intensity across them, or creating false edges due to gradual variation in intensity across a region. While methods of the second kind do produce edges that belong to object boundaries, these edges are typically fragmented and as such do not bear any relationship to one another. Thus, additional work is required to group and interrelate edges belonging to the same object.

Additionally, previous work by others in image segmentation has mostly centered on grouping pixels into regions based on spectral and textural similarity. The difficulty in estimating locally adaptive thresholds and neighboring sizes for evaluating this criteria, coupled with the need to evaluate at each pixel, often results in erroneous decompositions and high processing times. Many application-driven approaches, such as industrial vision for quality control and nondestructive analysis limit the scope of segmentation to a specific class of spectrally or structurally distinctive objects imaged in controlled lighting and background settings and achieve satisfactory results. However, these approaches are too restrictive to be of interest to the larger scientific goals of computer vision or to the wider applicability of its methods. Other methods, while not restricting the types of images or features require specification of the number of regions or parameters. Typically, the choice of these inputs is at best ad hoc as it is not clear a priori what is best for segmenting a particular image.

Various objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF INVENTION

In general, there is no single segmentation of an image that captures all possible features of interest since they occur at multiple scales and varying spectral prominence that determine their saliencies. Further, what is of interest in an image is quite often determined by what is sought in an image. Many application-driven approaches segment a specific class of spectrally or structurally distinctive objects and achieve satisfactory results via supervised or unsupervised methods. Other methods, while not restricting the types of features sought, require specification of the number of objects of interest, regions, or the specification of tolerances and parameters. Typically, the choice of these inputs is ad hoc as it is not clear a priori what is best for segmenting a particular image. It is desirable to have a segmentation scheme that reveals all potentially salient objects at different scales in a hierarchical manner so that general queries about image content can be addressed without a priori knowledge about the image. Furthermore it is desirable to have the content information available in a context-friendly manner so that parts of objects that are salient by themselves can be related to the objects they belong to or interact with at different scales in the hierarchy.

The present invention provides an approach to hierarchical image segmentation using an initial, fine-scale 'seed' segmentation that faithfully conforms to image contours, such as the vectorized image segmentation via trixel agglomeration method described in U.S. Pat. No. 7,127,104 (hereinafter referred to as VISTA). The polygons from this initial segmentation are then iteratively grouped based on their size distributions and spectral proximities to yield a hierarchy of image segmentations wherein each polygon at each level is an aggregate of one or more polygons at the previous, finer, level. Both object and texture regions are segmented in this method, with the successively coarser polygons inheriting the fidelity to image edges of the initial segmentation. This approach yields a rapid hierarchical segmentation and is capable of addressing very large, complex images such as aerial and satellite images.

BRIEF DESCRIPTION OF THE DRAWINGS

FIGS. 1a-f show the steps of the previously-disclosed vectorized image segmentation algorithm VISTA.

FIG. 2 shows examples of hierarchical segmentations obtained by disclosed method on a high contrast low texture image and a low contrast high texture image.

FIG. 3 shows examples of segmentations by disclosed method of camouflaged fish using wiggle filtering at coarse scales.

DETAILED DESCRIPTION

Figures 4, 5:
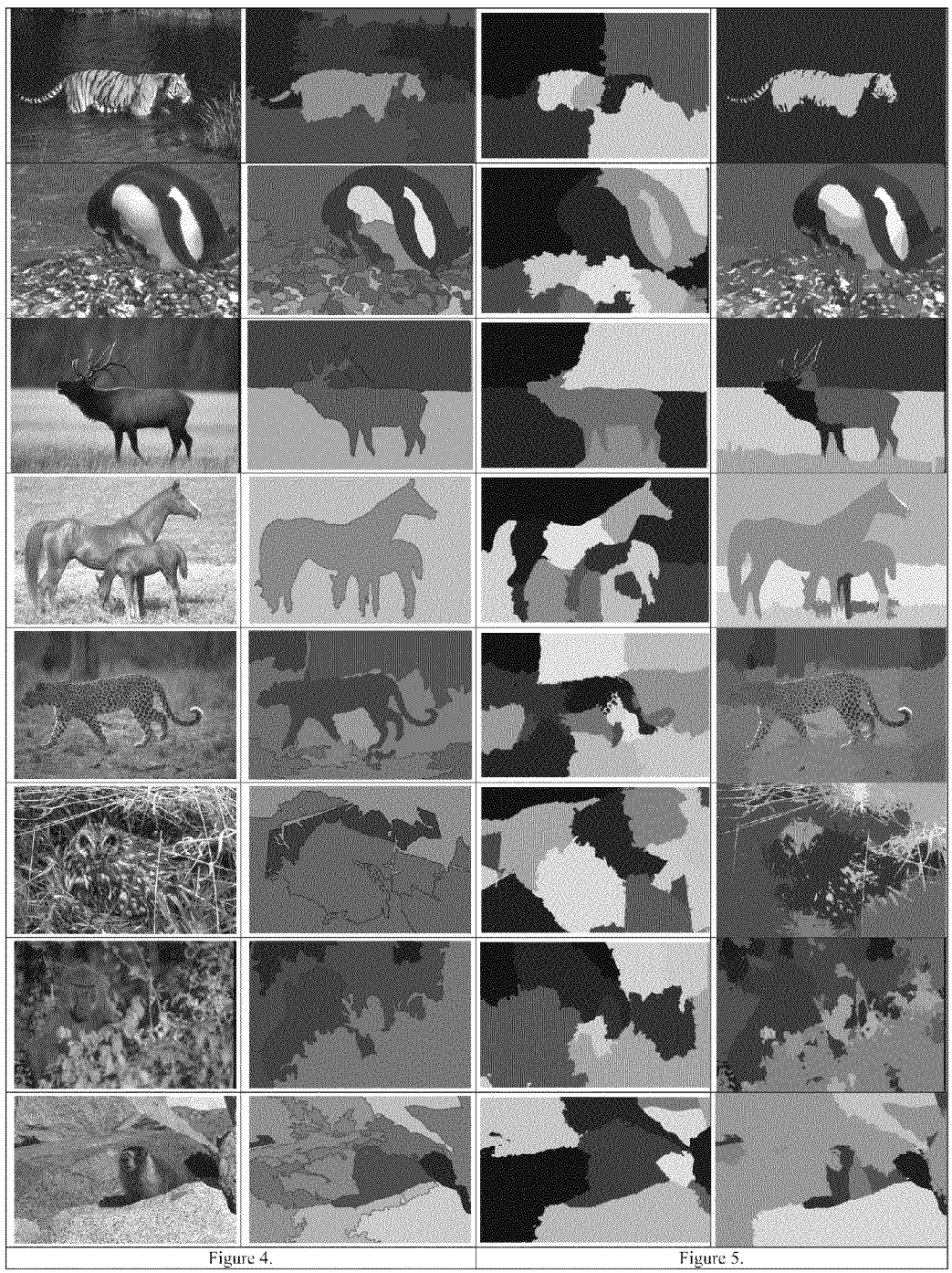
FIG. 4 shows example images from the Berkeley data set on the left and a select level from the hierarchical segmentations by disclosed method, on the right.
FIG. 5 shows the results of multiscale normalized cuts on the left and mean shift methods on the right applied to the same images as shown in FIG. 4.
Figure 6:
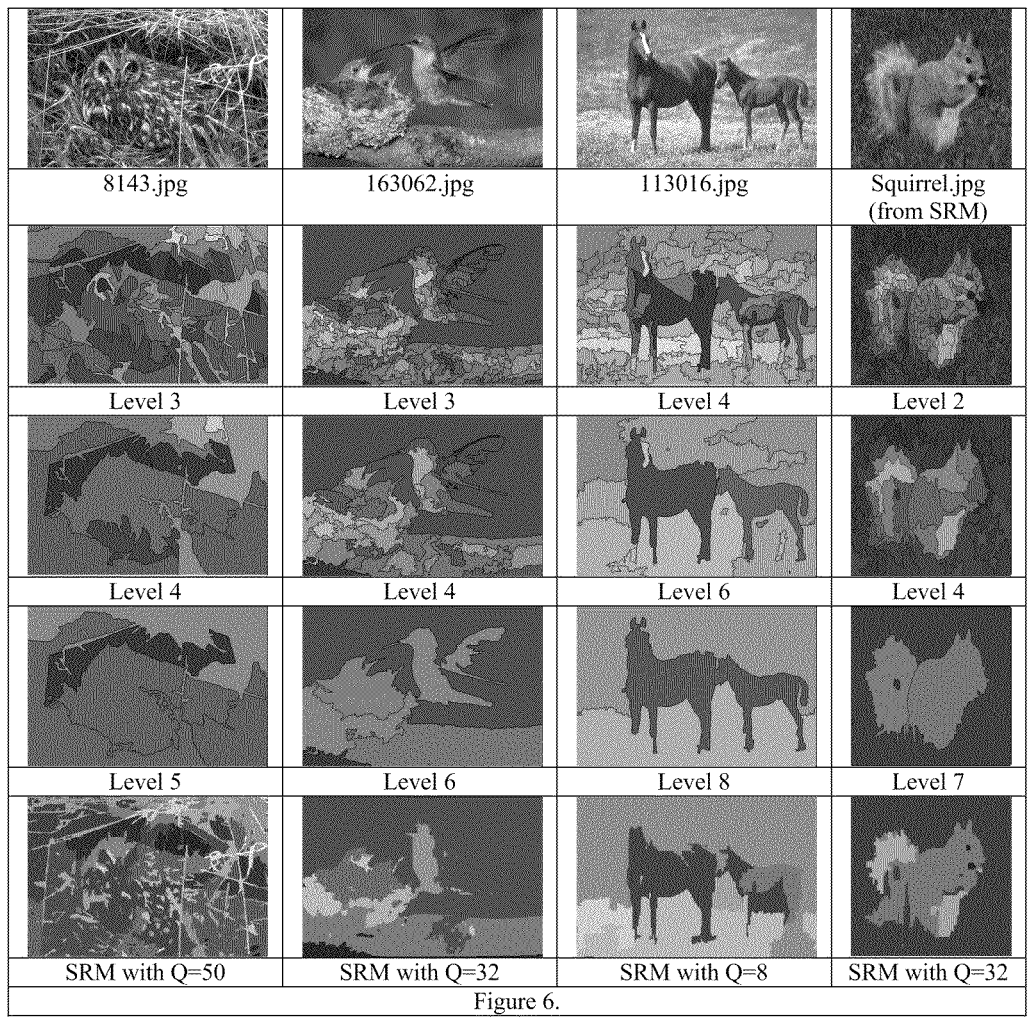
FIG. 6 shows a comparison of the hierarchical method of the present invention and that of Statistical Region Merging.

In the following description, like reference characters designate like or corresponding parts throughout the several views shown in the figures. It is also understood that terms such as "top," "bottom," "outward," "inward," and the like are words of convenience and are not to be construed as limiting terms. In addition, whenever a group is described as either comprising or consisting of at least one of a group of elements and combinations thereof, it is understood that the group may comprise or consist of any number of those elements recited, either individually or in combination with each other.

Referring to the figures in general, it will be understood that the figures are for the purpose of describing a particular embodiment of the invention and are not intended to limit the invention thereto.

Given an image comprised of pixels as input, a fine-scale seed segmentation of the image into polygons is obtained. Described here a particular embodiment of the invention that uses VISTA (U.S. Pat. No. 7,127,104) to obtain this initial segmentation. However, this invention applies equally well to alternate initial seed segmentations that 1) provide a polygonal decomposition of the input raster image comprised of pixels, 2) provide information about polygon color, adjacency, and the sequence of edge points shared between any two adjacent polygons. In the next three paragraphs the VISTA algorithm is briefly recapitualted.

VISTA is used to obtain an initial edge-based seed segmentation. This method represents a departure from the common approach of grouping pixels for segmenting images and, instead, obtains polygonal segmentations by perceptual grouping of image edge-adaptive triangular mesh elements. This method is shown in FIGS. 1a-1f. As shown in FIG. 1b, the first step is to obtain image edges by a Canny edge detection procedure. Next, a constrained Delaunay triangulation of the edge point set is performed so that no triangle edge intersects an edge between neighboring edge pixels as shown in FIG. 1c. The proximity graph property of Delaunay triangulations is used to establish regional correspondences between contour chains and provide candidate edge completions of the Canny contours, which are typically fragmented and open curves. The pixels in each triangle are sparsely sampled to estimate an average color to be attributed to the triangle as shown in FIG. 1d. These color-attributed triangles (trixels) are the new image primitives that will be grouped to yield polygonal image segments.

A grouping graph G is constructed, with nodes representing trixels and links representing adjacency of trixels. Cuts in G are introduced by identifying those edges between trixels that support desirable contour completions and deleting corresponding links in G. The evaluation of a trixel edge for contour completion is based on six elementary perceptual criteria (see Table 1 below), modeled as Boolean filters on the trixel edges and is a logical concatenation of these criteria.

TABLE 1

Boolean perceptual edge filters and their properties

| Filter | Property |
|---|---|
| TooLong | length > Median Delaunay edge length |
| Shortest | Shortest edge of either flanking trixel |
| Canny | Connects neighboring Canny edge points |
| EndLink1 | Connects (with minimum turn) end point of a contour to the interior of another contour (transversality) |
| EndLink2 | Connects two contour endpoints |
| Junction | At least one flanking trixel has all its vertices on different contours |

The cut criterion C is then given by:

C=(TooLong) [Canny EndLink1 EndLink2 (Junction Shortest)]

This criterion has been experimentally found to yield optimal results in terms of both image fidelity and polygon economy. A link l in G is cut if and only if C is equal to 1 for the corresponding edge between two trixels whose representative nodes in G are linked by l. Trixels in connected components of the resulting cut graph are grouped to obtain polygonal image segments, with each segment attributed the area-weighted average color of all constituent trixels as shown in FIG. 1e. The high efficiency of the initial segmentation (which can be prohibitively expensive with a method such as normalized cuts approach for segmenting large images) and the fact that the resulting polygons conform to image contours, are compelling reasons for employing VISTA as the starting point for a hierarchical segmentation scheme based on region growing. The fine-scale segments conforming to image contours, obtained by VISTA, assures edge integrity of coarser regions when successively merging polygons, unlike pixel-based region growing methods.

The following paragraphs describe an embodiment of the present invention that consists of a general algorithmic procedure to successively merge the fine-scale polygons obtained as initial seed segmentation into larger polygons representing visually salient features in an image. This results in a hierarchy of polygonal image segmentations of the input pixel image. The polygon agglomeration process ensures that each polygon in the initial or any intermediate level of segmentation in the hierarchy is fully contained in a polygon at the next, coarser level of segmentation. This containment property provides context of fin-scale features in terms of larger-scale features as well as information about the composition of larger features in terms of smaller features.

The procedure comprising the invention utilizes both spectral (i.e., pertaining to color or intensity) and structural (i.e., pertaining to size, boundary smoothness) relationships between adjacent polygons to determine whether two polygons should be merged into a larger polygon. The degree of proximity, similarity, or significance of a given property between polygons needed to prompt their merger is deduced using statistical analysis of the property's distribution over all polygons at the current level that is subject to agglomeration to obtain the next, coarser level of segmentation. This use of 'ecological' statistics to adaptively compute thresholds for degree of similarity of polygons with respect to a number of properties that determine their merger is a key strength of the proposed method. This eliminates the need to input parameters that optimally segment an image. Indeed, such parameters would need a priori knowledge of what works best for a particular image, which is generally unknown and image-dependant. Further, such parameters would differ from level to level even for a particular image in the proposed hierarchical segmentation. However, the extraction of parameters through polygon ecological statistics requires an abundance of samples to compute aggregates meaningfully. The current procedure ensures this by automatically checking for and identifying a pivot level in the hierarchical segmentation process, wherein the median number of seed polygons constituting polygons at the pivot level exceeds the number of polygons at the pivot level. This signifies that there is a greater abundance of samples within each polygon on average than in the entire level. This pivot level separates two main stages of the invention's procedure.

The first stage uses interpolygon statistics at any level to compute thresholds and degrees of similarities of polygon properties that determine their merger. The identification of a pivot level as described above marks the end of the first stage and the beginning of the second stage. The second stage computes, for each polygon, a distribution of values of each property over all polygons at the finest (seed) segmentation level. Two polygons are deemed similar with respect to a given property if their internal polygon distributions are less than a statistically computed aggregate deviation between two neighboring polygon distributions over all polygons in the level in question.

Stage 1 of the procedure is now described. Each polygon obtained from the fine-scale seed segmentation described above is represented as a node in a polygon adjacency graph. The area distribution of polygons provides a picture of the granularities comprising the image at that scale of segmentation. The modes of the distribution are referred to as the regions between two successive minima of the distribution. In order to avoid detecting insignificant modes minima that are the least values of the distribution over a fixed radius about any value are sought. By choosing the largest mode (i.e., peak with the largest area under it) of this distribution the perceptually dominant granularity of the image are identified. The image is then flattened to this level of granularity by merging polygons whose areas are equal to or less than the dominant grain size with their most similar neighbors, where the measure of similarity can be structural as well as spectral; for example, grain size, shape, orientation and or color/intensity.

To compute the distribution of polygons with respect to area, a histogram of the polygon numbers over the range of their areas is constructed. For the histogram to faithfully represent the distribution an appropriate bin size is estimated. In an example embodiment of the invention, this is done based on an algorithm proposed in the recent work of H. Shimazaki and S. Shinomoto, (H. Shimazaki and S. Shinomoto, "A method for selecting the bin size of a time histogram," *Neural Computation, vol.* 19, pp. 1503-1527, 2007) however, other methods of optimal histogram binning may also be used. They propose an algorithm which minimizes the mean integrated squared error of the histogram of a finite sample from an unknown distribution with respect to the distribution. This is equivalent to finding the bin size $\Delta$ that minimizes the cost function:

$$\Theta(\Delta) = \frac{2\mu(\Delta) - v(\Delta)}{\Delta^2}$$

where $\mu$, and $v$ are the mean and variance of the histogram of the sample with bin size $\Delta$.

This optimal binning is also used to obtain distributions of the red, blue, and green (R, G, B) channel values of polygon colors. Modes of these color channel distributions are identified and each polygon is attributed the mode number it belongs to in each channel's distribution. Two polygons are deemed to have similar color if all their respective channel mode numbers are in agreement. Other polygon properties such as orientation, aspect ratio, etc., can be similarly analyzed for a more careful control of the polygon merging process.

Each polygon at a given level is adjacent to one or more polygons. It therefore shares parts of its boundary with other polygons. Various structural properties are assigned to these polygon boundary interfaces to characterize how two polygons interact and decide whether an interface is likely to be an object boundary or not. Object polygons tend to have smoother boundaries than texture polygons which tend to be significantly more oscillatory in nature. This is because edges of objects are typically longer and smoother than texture elements which are typically smaller and tend to clump into polygons with wiggly meandering contours. This feature can be utilized as a perceptual cue to detect texture content in an image and prevent texture polygons from merging with object polygons at coarser scales. A simple measure of boundary 'wiggle' for a polygon A is defined as:

$$W(A) = 1 - \frac{L_S(A)}{L(A)}$$

Where $L(A)$ is the boundary length of the polygon and $L_S(A)$ is the length of its smoothed boundary. For two adjacent polygons A and B, noting that:

$$L(A \cup B) = L(A) + L(B) - 2L(A \cap B)$$

and $$L_S(A \cup B) \le L_S(A) + L_S(B) - 2L_S(A \cap B)$$

results in $$W(A \cup B) \ge \frac{W(A)L(A) + W(B)L(B) - 2W(A \cap B)L(A \cap B)}{L(A) + L(B) - 2L(A \cap B)}$$

where $$W(A \cap B) = 1 - \frac{L_S(A \cap B)}{L(A \cap B)}$$

is the wiggle of the boundary interface of polygons A and B and $L(A \cap B)$, $L_s(A \cap B)$ are the length and smoothed length, respectively of the interface boundary. Although the equation above is an inequality, the difference between the two sides is typically small and due to the differences in smoothing at the points where the adjacency of the polygons begins and ends along their common interface. Therefore the right hand side of the equation is a good approximation of the wiggle of the union of two polygons and we use it to efficiently estimate the latter quantity without actually merging the two polygons first. The wiggle and length of the interface can be computed at a lower cost from the polygon adjacency graph constructed at each level of the hierarchy. A boundary or boundary interface is described as salient if it is greater than a certain length and if its wiggle is less than a certain quantity. This notion helps identify boundary interfaces that are likely to be object boundaries.

In order to effectively use the notions of wiggle and saliency, it is necessary to compute adaptive thresholds as internal parameters that decide when a boundary is wiggly or salient. For each polygon lengths of the longest and shortest boundary interfaces are obtained and the wiggle values of the most and least wiggly interfaces are also obtained. From this the medians of the maximal interface lengths, the minimal interface lengths, the maximal interface wiggles, and the minimal interface wiggles are computed. The boundary interface of polygons A and B are defined as salient if $L(A \cap B) \geq$ median(maximal interface lengths) and if $W(A \cap B) \leq$ median(minimal interface wiggles). Further a boundary is defined as a pseudoboundary if it is not salient and if either $W(A \cup B) \leq \min(W(A), W(B))$, or $W(A \cup B) \geq$ median(maximal interface wiggles).

So far, the criteria of granularity, spectral similarity, saliency, and pseudoboundary have been defined to describe certain perceptual properties of polygons and their boundary interactions at any given level. Using these notions the steps in the first stage of the invention are as follows:

1. The seed segmentation of an input image is obtained.
2. The area distribution of all polygons at the current topmost level is obtained by optimally binning the areas (e.g., as done by Shimazaki and Shinomoto).
3. Modes of the area distribution are obtained.
4. The mode with the most number of polygons is identified and all polygons whose areas are less than the mean plus one standard deviation of this mode are marked as grain polygons.
5. Optimal distributions of the red, green, and blue (R, G, B) color channel values of all polygons is obtained as in step 2.
6. Modes of R, G, and B distributions are obtained and each polygon is assigned its R, G, and B mode number.
7. The neighborhood structure of each polygon, consisting of all adjacent polygons, is obtained. From this the lengths and wiggles of the common boundaries of the polygon with its neighbors are computed.
8. The median values of the maximal and minimal lengths and wiggles over all polygon interface boundaries are computed.
9. Values computed in step 8 are used as thresholds for determining salient and pseudoboundary polygon interface boundaries (as described in previous paragraph)
11. Each polygon in the current level is evaluated for grouping with its neighbors as follows:
    a) If the polygon is a grain (see step 4) then it is eligible for merging with one or more of its neighbors.
    b) A grain polygon may merge with a neighbor if it:
        i) either shares the same R, G, and B mode numbers (see steps 5 & 6) with the neighbor
        or
        ii) its common boundary with the neighbor is a pseudoboundary (see step 9) and the neighbor is closest in color to the polygon among all its neighbors.
12. Among the set of set of neighboring polygons eligible for merging with the polygon in question, only those whose color distance is the least are allowed to merge with the polygon.
13. The resulting new polygons from mergers in step 12 are assigned the area-weighted average color of their constituent polygons.
14. The median number of seed polygons constituting each newly formed polygon is computed
15. Steps 2 through 14 are repeated until the number of polygons in the current level falls below the median number of seed polygons constituting them. That is to say, until the current level is the pivot level.

The detection of the pivot level marks the end of Stage 1 of the invention's procedure.

Stage 2 of the procedure is now described. The pivot level signifies that the number of samples within each polygon is on average greater than the number of polygon samples at the pivot level. At this stage, each polygon is viewed as a restriction of the distribution of seed (finest level) polygons. Thus each polygon is a 'texture' determined by the color and size distributions of its constituent seed polygons. Accordingly, two polygons are compared for similarity with respect to a property by computing a statistical distance between their seed polygon distributions representing the property.

In particular, the color of a polygon is no more represented by a vector of R, G, B color channel values, but by three distributions, one for each color channel. The value of each channel's distribution at a certain value of channel intensity is the area-weighted sum of all seed polygons with that value of channel intensity. For example, P and Q are two adjacent polygons with their R, G, B, distributions RhistP, GhistP, BhistP, and RhistQ, GhistQ, BhistQ, respectively. RhistI, GhistI, BhistI are defined to be the distributions corresponding to the 'polygon' corresponding to the entire image I. Then the distributions of P and Q are the restrictions of the image distributions to the seed polygons constituting P and Q, respectively. We define the dissimilarity of two polygons with respect to the color channels as $$D(P, Q) = \sum_i (RhistP = RhistQ)^2 / RhistI + \sum_i (GhistP = GhistQ)^2 / GhistI + \sum_i (BhistP = BhistQ)^2 / BhistI$$

where the summation is over all the channel intensity values considered (usually 0 through 255 for RGB color scheme). This distance differs from the chi-squared distance between distributions in that the denominator distribution in each summand is not the average of the two distributions in the numerator but, rather, a universal distribution from which all the polygon distributions are drawn. This measure suppresses differences between polygons which are well represented numbers or areas in the image while it highlights differences between polygons that are sparsely represented. Thus it is well-adapted to merging texture areas while preserving distinctive features. In other embodiments of this invention one may use other distributional distances such as the Fischer distance or the Kullback-Liebler distance measuring mutual information between distributions.

Using the above notion of dissimilarity between two polygons for levels beyond the pivot level, we define two other quantities, namely the external disparity DispE, and the internal disparity, DispI for any polygon P as $$DispE(P) = \min_{Q \in Nbd(P)} (D(P, Q)) \text{ and}$$

$$DispI(P) = \underset{Q \subseteq P}{median}(DispE(Q))$$

The external disparity of a polygon measures the minimum dissimilarity of a polygon with respect to its adjacent neighbors, while its internal disparity measures the median external disparity of the polygons at the previous level constituting it.

Internal disparity measures the heterogeneity of a polygon's constitution, while external disparity measures the minimum dissimilarity with respect to its immediate surroundings. These two quantities will be used during the second stage to control the polygon merging process in a perceptually guided manner.

The steps in stage 2 of the invention's procedure are as follows:
1. Color channel distributions for each polygon at current level and for the entire image are obtained (as described in the previous paragraph)
2. Dissimilarities between all adjacent polygons at the current level are computed.
3. The internal and external disparities of all polygons at the current level are computed.
4. The pseudoboundary polygon interfaces are identified (as in stage 1).
5. Each polygon in the current level is evaluated for grouping with its neighbors as follows:
   A polygon may merge with one or more of its neighbors if all three following conditions are satisfied
   a) Its external disparity is less than or equal to the median of the external disparities of all polygons at the current level, or its internal disparity is greater than its external disparity.
   b) The dissimilarity of its qualifying merge neighbor is equal to the external disparity of the polygon (i.e., the neighbor is the least dissimilar)
   c) The boundary interface with a qualifying merge neighbor is a pseudoboundary, or the merge neighbor's color distance from the polygon is less than the median of the minimal color distances of all polygons from their neighbors
6. Of all candidate merge neighbors of a polygon identified in step 5, only those that are closest in color to the polygon are allowed to merge with the polygon
7. Steps 1 through 6 are repeated to produce new levels in the hierarchical segmentation until no new polygonal mergers are possible.

The end of stage 2 completes the hierarchical segmentation process.

FIG. 2 illustrates the methods with layers 2 to 4 from the hierarchical segmentations of two images in the Berkeley image segmentation data set. The top row depicts the input pixel images. The disclosed method of hierarchical segmentation clearly preserves boundary fidelity at all levels as illustrated in FIG. 2. That is to say, all boundaries at any level are a subset of the original boundaries and no new ones are created. This is due to the inheritance of Canny edges by polygons from those constituting them at the previous level.

FIG. 3 illustrates the use of wiggle to suppress texture and extract camouflaged fish in ocean floor imagery. Thus the hierarchical segmentation scheme disclosed herein not only preserves contour integrity across coarsening scales but also provides an easy way to detect and isolate texture from salient objects even in very challenging imagery.

FIG. 4 shows a coarse-scale level polygonal decomposition as obtained by the disclosed hierarchical method (second column from left), depicting extracted important features for each of the input pixel images shown on the leftmost column. The choice of the example input images was motivated by feature complexity, variability in contrast, texture, and color.

FIG. 5 illustrates the performance of two other well-known methods, namely the multiscale normalized cuts method (third column from left) and the mean shift method (fourth column from left) on the same set of input images shown in FIG. 4.

Apart from the qualitative superiority of the results of the disclosed method shown in FIG. 4 over those of the other two methods, shown in FIG. 5, there are operational differences between the disclosed method and the compared methods. In both cases of the compared methods the required input parameters were selected through trial and error on a per image basis to obtain visually best segmentations for each image such that the salient features of interest were depicted with the least number of polygons. In the case of the multiscale normalized cuts method, the number of regions that obtained best results for each image were selected, whereas, in the case of the mean shift method the spatial and spectral bandwidth parameters that obtained the best results, again on a per image basis we selected. In contrast, there are no input parameters for the disclosed method. The Canny edge detection parameters that govern the initial segmentation in this embodiment of the invention that used VISTA for obtaining a seed segmentation were fixed at sigma=1 and the high and low hysteresis thresholds were fixed at 0.6 and 0.0, respectively for all images. Both the multiscale Ncuts and the mean shift methods yield over-segmentations of salient objects of interest compared to the disclosed method. This necessitates further processing to assemble the parts into a meaningful whole for object recognition. Although the mean shift method produced visually better looking segmentations, the number of regions produced by it is significantly larger than the other two methods. For instance, in the case of the leopard image, each spot is a different segment in the mean shift result, and the leopard does not correspond to a single polygonal segment as in the disclosed method. The disclosed method also produces a hierarchy of segmentation images at multiple scales with features of different saliencies extracted at different levels whereas the other two methods produce a single segmentation image for a given input image and parameter set. Thus, to obtain finer or coarser scale features, these methods would require re-segmentation of the image. The segments obtained at different scales by our method form a tree with finer scale segments nested in segments at a coarser level, providing contextual information. The segments obtained by the multiscale normalized cuts and the mean shift methods do not have this hierarchical containment property across scales. Thus the same object may be segmented in two different ways for differing parameters with the segments intersecting across the results. The disclosed method explicitly provides the contours of the segments, while the other two methods provide pixel masks for the segments requiring further processing to obtain contours. Finally, as illustrated in Table 2, the disclosed hierarchical method is an order of magnitude faster than the other two methods. This is even allowing for a ten-fold speedup in a C implementation of the multiscale normalized cuts method over the MatLab implementation tested here.

TABLE 2

Comparison of run times (T) in seconds and the number of segmented regions (N) obtained by our method, the multiscale normalized cuts method, and the mean shift method for the eight images in FIGS. 4 and 5. All timings were taken on a 2.13 GHz Intel Pentium M processor with 2 GB of RAM.

| Image | Disclosed Method | | Multiscale Ncuts | | Mean Shift | |
|---|---|---|---|---|---|---|
| | T | N | T | N | T | N |
| Elk | 0.30 | 3 | 41.9 | 5 | 15.4 | 65 |
| Tiger | 0.52 | 8 | 57.5 | 7 | 25.7 | 105 |

TABLE 2-continued

Comparison of run times (T) in seconds and the number of segmented regions (N) obtained by our method, the multiscale normalized cuts method, and the mean shift method for the eight images in FIGS. 4 and 5. All timings were taken on a 2.13 GHz Intel Pentium M processor with 2 GB of RAM.

| Image | Disclosed Method | | Multiscale Ncuts | | Mean Shift | |
|---|---|---|---|---|---|---|
| | T | N | T | N | T | N |
| Horse | 0.55 | 2 | 105.6 | 13 | 15.4 | 121 |
| Marmot | 0.56 | 16 | 91.2 | 12 | 19.9 | 207 |
| Baboon | 0.34 | 5 | 69.2 | 7 | 15.9 | 371 |
| Penguin | 0.33 | 72 | 182.6 | 17 | 18.0 | 791 |
| Owl | 0.51 | 5 | 121.4 | 10 | 43.8 | 1255 |
| Leopard | 0.40 | 11 | 156.0 | 17 | 47.6 | 1952 |

As discussed, the disclosed method is a highly efficient linear time algorithm for hierarchical image segmentation based on that it:

reveals objects and features at various saliencies,
preserves boundary integrity across scales,
provides contextual information in a segmentation tree of nested object with parent-child relationships,
provides boundary information without additional effort because of vector (polygonal) segments,
allows the detection of texture in images and handle them differently from object segments.

Additional structural, spectral, and statistical criteria may be easily incorporated to significantly enhance or specialize the segmentation performance. No parameters need to be varied to segment different images. The number of segments at each level and the total number of levels is completely data adaptive. Applications such as automated content-based classification, archival, and retrieval of images, video analysis, etc., require not only efficient but also robust image segmentation methods that do not assume a priori knowledge of image characteristics or parameters to segment and analyze them. Further, to accommodate a wide range of queries on image content, segmentations must preemptively provide features at multiple scales and in a manner in which they can be related to extract image semantics via object/feature context. The disclosed method addresses these concerns.

What is claimed is:

1. A method for decomposing a pixel image into a hierarchy of progressively coarser polygonal segments at multiple levels comprising:
    starting with a seed decomposition of the pixel image comprising of fine-scale polygonal regions such as provided by VISTA;
    compiling local structural and statistical information about the each polygon's neighbor polygons at each level;
    compiling global statistics and threshold parameters based on the global statistics for all polygons at each level; and
    merging the polygons based on the structural and statistical information and certain perceptual principles embodied as Boolean predicates to obtain a coarser level polygonal segmentation.

2. The method of claim 1, further comprising:
    successively merging the polygons at each level to obtain a new level of fewer but larger polygons representing a coarser decomposition of the pixel image, until the final level consists of only one polygon or no more polygon mergers are possible to obtain a new level with fewer polygons.

3. The method of claim 1, wherein the statistical information includes information about one or more of the following attributes of the neighbors of each polygon: polygon color distribution, polygon area distribution, and characteristics such as wiggly, salient, and pseudoboundary, of the edges of the neighboring polygons bordering the polygon in question.

4. The method of claim 3, wherein the characteristics of the edges of the neighboring polygons include their oscillatory nature as defined by the 'wiggle' measure, significance of length and smoothness as defined by the 'salient' Boolean predicate, and the unlikeliness of an edge being an object boundary as characterized by the 'pseudoboundary' Boolean predicate.

5. The method of claim 3, wherein the information about polygon color includes information about the relative commonness of that color within the image.

6. The method of claim 3, wherein the polygons are merged based on any combination of the compiled structural and statistical information.

7. The method of claim 1, wherein the structural and statistical information is compiled using a computer algorithm.

8. The method of claim 2, wherein the hierarchy comprises successively coarser polygonal image decompositions into multiple levels, with each polygon at any level being comprised of certain polygons at the previous finer level, and contained in a polygon at a subsequent, coarser level, if such a level exists.

9. The method of claim 7 wherein the hierarchy of image segmentations provides information about the spatial context and content of each polygon with respect to its neighbors at each level of the hierarchy, its membership in a coarser polygon, and its composition by finer polygons.

10. The method of claim 3, wherein additional statistical and structural information may be compiled to further refine the polygon merging criteria.

* * * * *